US011052648B2

(12) United States Patent
Ferrara, Jr. et al.

(10) Patent No.: US 11,052,648 B2
(45) Date of Patent: Jul. 6, 2021

(54) METHOD AND SYSTEM FOR IMPROVING STRUCTURAL INTEGRITY IN THREE-DIMENSIONAL OBJECTS PRODUCED BY A THREE-DIMENSIONAL OBJECT PRINTER

(71) Applicant: Xerox Corporation, Norwalk, CT (US)

(72) Inventors: Joseph M. Ferrara, Jr., Webster, NY (US); Mark A. Atwood, Rush, NY (US)

(73) Assignee: Xerox Corporation, Norwalk, CT (US)

(*) Notice: Subject to any disclaimer, the term of this patent is extended or adjusted under 35 U.S.C. 154(b) by 1033 days.

(21) Appl. No.: 15/431,860

(22) Filed: Feb. 14, 2017

(65) Prior Publication Data
US 2018/0229445 A1 Aug. 16, 2018

(51) Int. Cl.
B29C 64/112 (2017.01)
B33Y 50/02 (2015.01)
B33Y 10/00 (2015.01)
B33Y 30/00 (2015.01)
B29C 64/245 (2017.01)
B29C 64/227 (2017.01)

(52) U.S. Cl.
CPC ............ B33Y 50/02 (2014.12); B29C 64/112 (2017.08); B29C 64/227 (2017.08); B29C 64/245 (2017.08); B33Y 10/00 (2014.12); B33Y 30/00 (2014.12)

(58) Field of Classification Search
CPC .................................................... B29C 64/241
See application file for complete search history.

(56) References Cited

U.S. PATENT DOCUMENTS

2002/0020945 A1    2/2002  Cho et al.
2007/0046705 A1*   3/2007  Wong ..................... B41J 29/393
                                                    347/14
2009/0004380 A1    1/2009  Hochsmann et al.
2015/0021830 A1    1/2015  Yerazunis et al.
2015/0290860 A1   10/2015  Shaw

FOREIGN PATENT DOCUMENTS

EP    1 951 505 B1   8/2008
FR       2684590 A1  6/1993

* cited by examiner

Primary Examiner — Monica A Huson
Assistant Examiner — Kelsey C Grace
(74) Attorney, Agent, or Firm — Maginot Moore & Beck LLP

(57) ABSTRACT

A printer is configured with an actuator to rotate a platen about an axis perpendicular to the surface of the platen and an encoder that generates angular data corresponding to the rotation of the platen. A controller operates the actuator to rotate the platen while monitoring the angular data generated by the encoder to ensure accurate rotation of the platen after each layer of an object is printed. By forming successive layers at different angles to one another, the structural integrity of the object is improved over previously known printed objects and the effects of defective ejectors are mitigated without having to substitute operational ejectors for the defective ejectors.

7 Claims, 6 Drawing Sheets

METHOD AND SYSTEM FOR IMPROVING STRUCTURAL INTEGRITY IN THREE-DIMENSIONAL OBJECTS PRODUCED BY A THREE-DIMENSIONAL OBJECT PRINTER

TECHNICAL FIELD

The system and method disclosed in this document relates to printing systems generally, and, more particularly, to systems and method for mitigating structural defects in objects produced by three-dimensional (3D) object printers.

BACKGROUND

Three-dimensional (3D) object printers operate one or more ejectors to eject drops of material onto a platen to form an object by layers. The materials are generally classified as build or support materials. Build materials are those materials that form part of the object being produced, while support materials are those materials that form support structures that enable an object to be built and then are removed once the object manufacture is complete.

A typical printer uses one or more ejectors that can be organized in one or more ejector heads. The ejectors eject drops of material across an open gap to a platen, which can be a planar member on which an object is built layer by layer or a cylindrical member that rotates about the ejectors for formation of an object. The ejectors can be implemented with piezoelectric, thermal, or acoustic actuators that generate mechanical forces that expel material drops through an orifice in response to an electrical voltage signal, sometimes called a firing signal. The amplitude, or voltage level, of the timing signals affects the amount of material ejected in each drop. The firing signals are generated by a controller in accordance with object layer data. A printer forms a printed object layer in accordance with the object layer data by printing a pattern of individual drops at particular locations on the platen or previously formed object layers on the platen. The locations where the drops land are sometimes called "drop locations," "drop positions," or "pixels." Thus, a printing operation can be viewed as the placement of material drops on a platen or object layer in accordance with object layer data.

The ejector heads or the platen or both are operatively connected to one or more actuators to move the ejector heads and platen relative to one another. The direction in which an ejector head moves past the platen to form an object layer is known as the process direction. Once the ejector head or heads move in one process direction with respect to the platen to form an object layer, the ejector head or heads can return to the starting position for another object layer forming pass in the same process direction or the ejector head or heads can reverse the process direction to form the next object layer in the opposite direction. The bi-directional movement requires additional computation to support the layer formation in reverse, but it decreases the time required for the formation of the next layer since the ejector head or heads form another layer as the head or heads return to the starting position.

While the unidirectional or back and forth formation of object layers is efficient for producing object layers, some issues arise from this type of manufacturing technique. For one, some build materials or object geometries develop weaknesses in object strength in the cross-process direction. For another, sometimes ejectors in an ejector head become defective and either do not eject material drops accurately or do not eject material drops at all. These errant or missing material drops can have an adverse effect on the object as the missing or errant drops accumulate as the number of layers increases. Mitigating the effect of defective ejectors or improving the structural strength of objects produced by 3D printers would be beneficial.

SUMMARY

A method of operating a 3D object printer mitigates the effect of defective ejectors on manufactured objects and improves the structural integrity of the objects. The method includes operating at least one actuator with a controller to move at least one ejector head across a platen while operating ejectors in the at least one ejector head to form a first layer of an object on the platen with reference to object layer data, operating the at least one actuator with the controller while monitoring angular data generated by an encoder to rotate the platen a predetermined number of degrees with reference to a z-axis through a center of the platen, and operating the at least one actuator with the controller to move the at least one ejector head across the platen while operating the ejectors in the at least one ejector head to form a second layer of the object on the platen with reference to object layer data, the second layer being oriented at the predetermined number of degrees to the first layer.

A printer is configured to mitigate the effect of defective ejectors on manufactured objects and improves the structural integrity of the objects. The system includes a platen, at least one ejector head having a plurality of ejectors configured to eject drops of a material towards the platen, at least one actuator operatively connected to the platen and to the at least one ejector head, an encoder configured to generate angular data corresponding to rotation of the platen, and a controller operatively connected to the at least one actuator, the encoder, and the ejectors in the at least one ejector head. The controller is configured to: operate the at least one actuator to move the at least one ejector head across the platen while operating the ejectors in the at least one ejector head to form a first layer of an object on the platen with reference to object layer data, operate the at least one actuator while monitoring angular data generated by an encoder to rotate the platen a first predetermined number of degrees with reference to a z-axis through a center of the platen, and operate the at least one actuator to move the at least one ejector head across the platen while operating the ejectors in the at least one ejector head to form a second layer of the object on the platen with reference to object layer data, the second layer being oriented at the first predetermined number of degrees to the first layer.

BRIEF DESCRIPTION OF THE DRAWINGS

A method and system is described below, by way of example, with reference to the accompanying drawings, in which like reference numerals refer to like elements, and in which.

DETAILED DESCRIPTION

Figure 1:
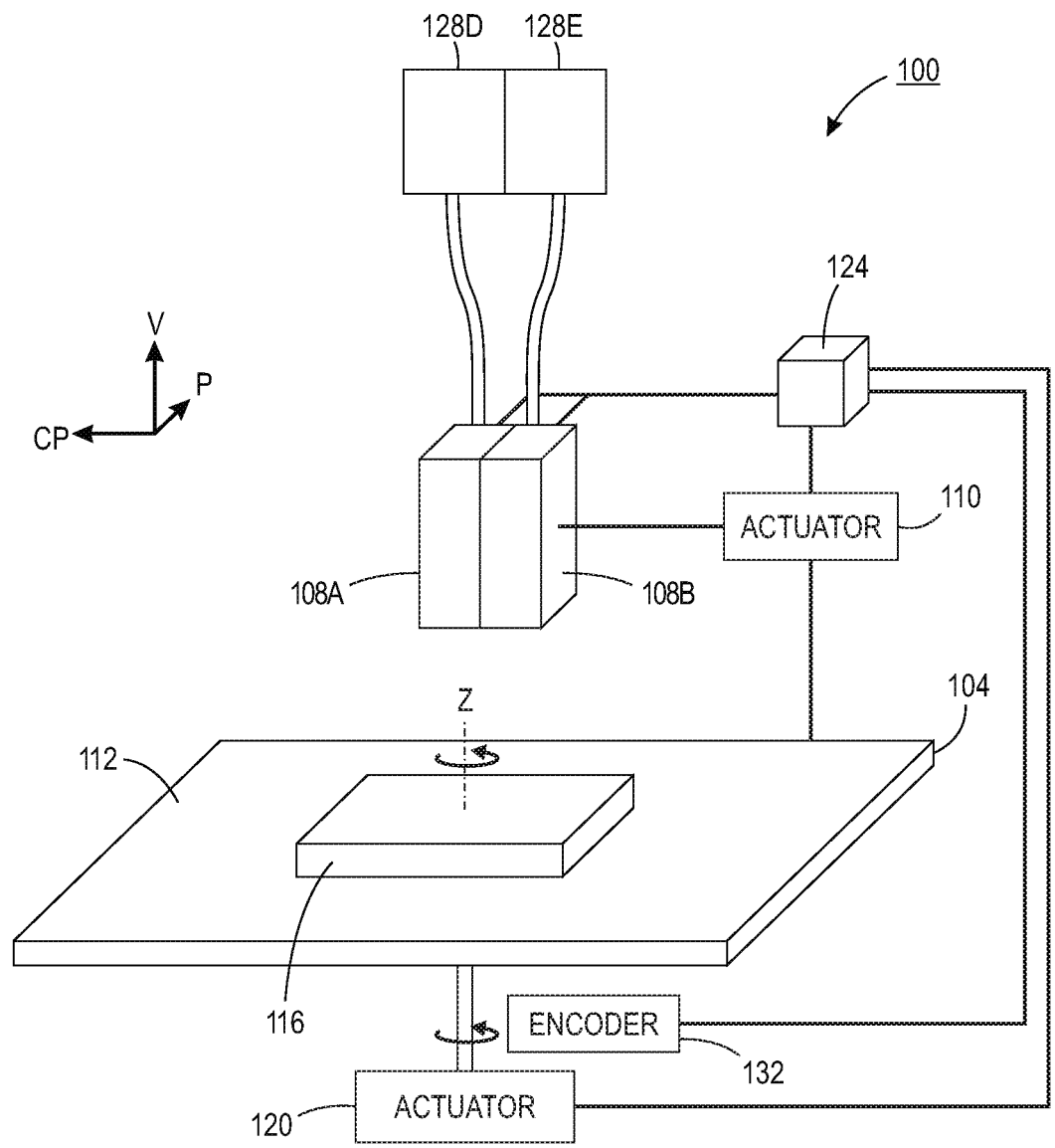
FIG. 1 is a schematic view of an improved printing system that rotates the platen ninety degrees between layers to improve the structural integrity of objects formed by the system.

For a general understanding of the environment for the method and printer disclosed herein as well as the details for the method and printer, reference is made to the drawings. In the drawings, like reference numerals designate like elements.

FIG. 1 shows a three-dimensional (3D) object printer 100. The printer 100 comprises a platen 104 and a pair of ejector heads 108A and 108B. The ejector heads 108A and 108B are operatively connected to one or more actuators 110 to enable independent movement of each ejector head in the process direction, cross-process direction, and vertical direction as explained further below. Each ejector head 108A and 108B has one or more ejectors configured to eject drops of build material towards a surface 112 of the platen 104 to form a three-dimensional object, such as the object 116. The ejectors of the ejector head 108A are configured with supply 128A to eject drops of a build material to form a three-dimensional object and the ejectors of the ejector head 108B are configured with supply 128B to eject drops of a support material for formation of support structure during manufacture of object 116. As used in this document, "support" means one or more layers of support material that enable layers of build material for a portion of the object to be formed without gravity or laminar flow of the build material causing deformation. This support material is later removed from the finished part. The particular arrangement of the ejector heads 108A and 108B shown in FIG. 1 is merely for illustrative purposes. In some embodiments, the ejectors in each of the ejector heads 108A and 108B are arranged in several rows or columns. The ejector heads 108A and 108B are configured to move as a group relative to the platen 104 in the process direction P, the cross-process direction CP, and the vertical direction V. In some embodiments, the printer 100 includes actuators configured to move one or both of the ejector heads 108A and 108B and the platen 104 with respect to one another in these directions.

The printer 100 includes a controller 124 operatively connected to at least the ejector heads 108A and 108B and the actuators 110 that move the ejector heads. The controller 124 is configured to operate the ejector heads 108A and 108B with reference to image data that has been transformed into object layer data to form a three-dimensional object on the platen surface 112. In some embodiments, the image data comprise a three-dimensional model that indicates a shape and size of an object to be formed. In previously known printers, the controller 124 operates the actuators 110 of the printer 100 to sweep the ejector heads 108A and 108B one or more times in the process direction P, while ejecting drops of material towards the platen 104. After each layer is formed, the ejector heads 108 move away from the platen 104 in the vertical direction V before beginning to print the next layer.

To enable the printer 100 to mitigate the effect of defective ejectors on manufactured objects and improve the structural integrity of the objects, the system 100 has been configured with at least one actuator 120 that rotates the platen 104 about a z-axis that extends perpendicularly from the surface 112 of the platen 104 and with at least one encoder 132 that generates data that accurately describes the rotational position of the platen about the z-axis that is perpendicular to the surface 112 of the platen 104. Such encoders are sold by MicroE Systems of Bedford, Mass. as the OPS Series Encoders. The output of the encoder is connected to the controller 124 to enable the controller 124 to operate the actuator 120 accurately to turn the platen 104 ninety degrees between formation of layers with the ejectors in the ejector heads 108A and 108B. Because the layers are formed on one another orthogonally, the structural integrity of the object is improved.

Figure 2:
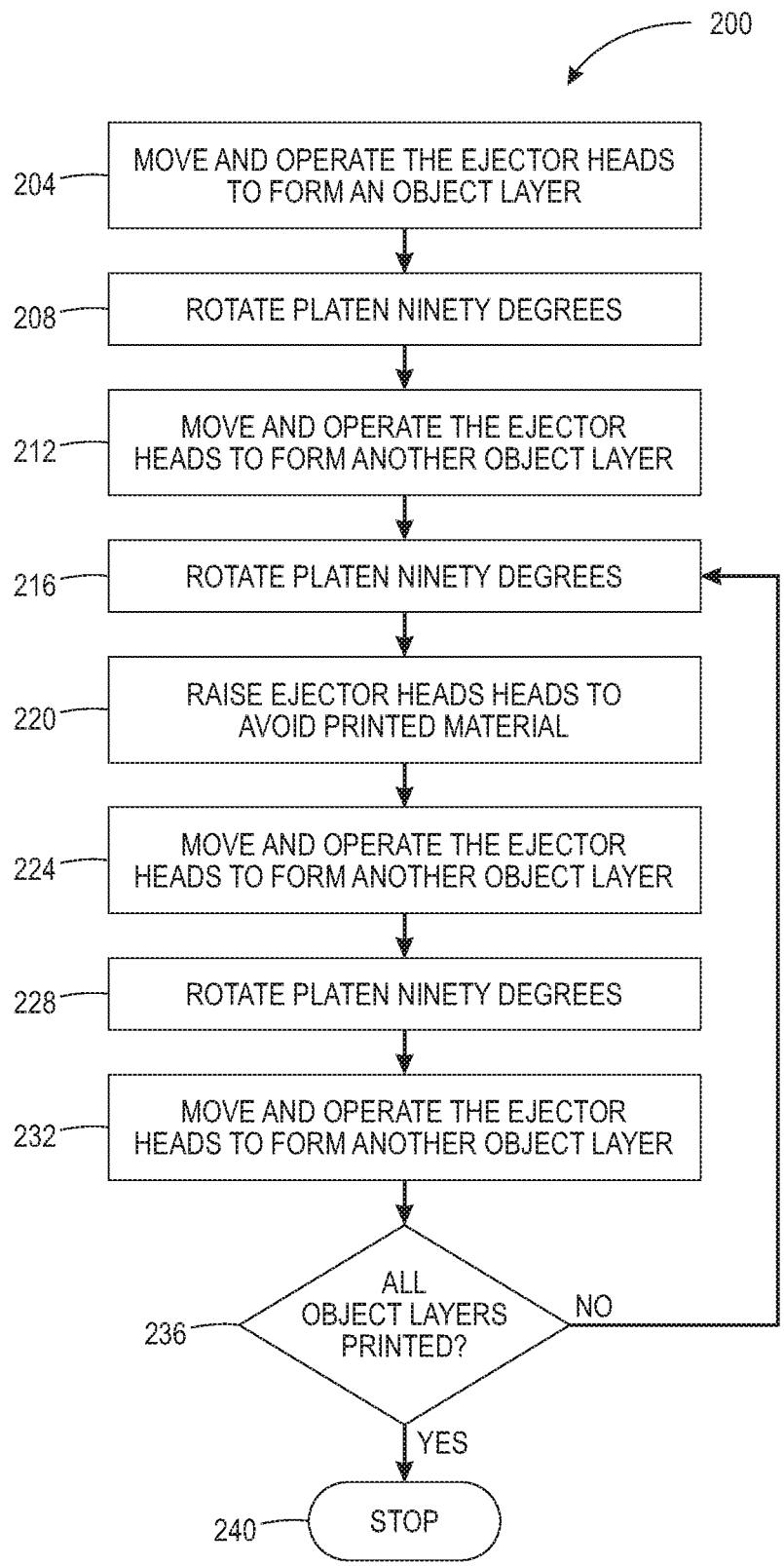
FIG. 2 depicts a method for operating the printer of FIG. 1 to improve the structural integrity of objects formed by the system.

A method for forming objects with the system 100 is shown in FIG. 2. The method 200 begins with the controller 124 operating the at least one actuator 110 to move the ejector heads 108A and 108B across the platen 104 in the process direction while operating the ejectors in the ejector heads to form a layer of the object on the platen with reference to object layer data (block 204). Once the ejector heads have past the platen, the controller 124 operates actuator 120 to rotate the platen 104 ninety degrees with reference to the z-axis through the center of the platen while monitoring the angular data generated by the encoder 132 to control the rotation (block 208). The process continues with the controller 124 operating the at least one actuator to move the ejector heads 108A and 108B across the platen 104 in the process direction while operating the ejectors in the ejector heads to form a layer of the object on the platen with reference to object layer data (block 212). The reader should note that the process direction for this pass of the ejector heads is perpendicular to the process direction during the first pass. Once the ejector heads have past the platen, the controller 124 operates an actuator to rotate the platen 104 an additional ninety degrees with reference to the z-axis through the center of the platen while monitoring the angular data generated by the encoder 132 to control the rotation (block 216). The process continues with the controller 124 operating the at least one actuator 110 to raise the ejector heads 108A and 108B a predetermined distance from the platen since the heads are now aligned with the material ejected during the first pass (block 220). The process continues with the controller 124 operating the actuators to move the ejector heads 108A and 108B across the platen 104 in the process direction while operating the ejectors in the ejector heads to form a layer of the object on the platen with reference to object layer data (block 224). Once the ejector heads have past the platen, the controller 124 operates actuator 120 to rotate the platen 104 an additional ninety degrees with reference to the z-axis extending through the platen while monitoring the angular data generated by the encoder 132 to control the rotation (block 228). The process continues with the controller 124 operating the at least one actuator to move the ejector heads 108A and 108B across the platen 104 in the process direction while operating the ejectors in the ejector heads to form a layer of the object on the platen with reference to object layer data (block 232). The process continues through the processing of blocks 216 to block 236 until all of the layers of the object have been printed (block 240).

Figure 3A:
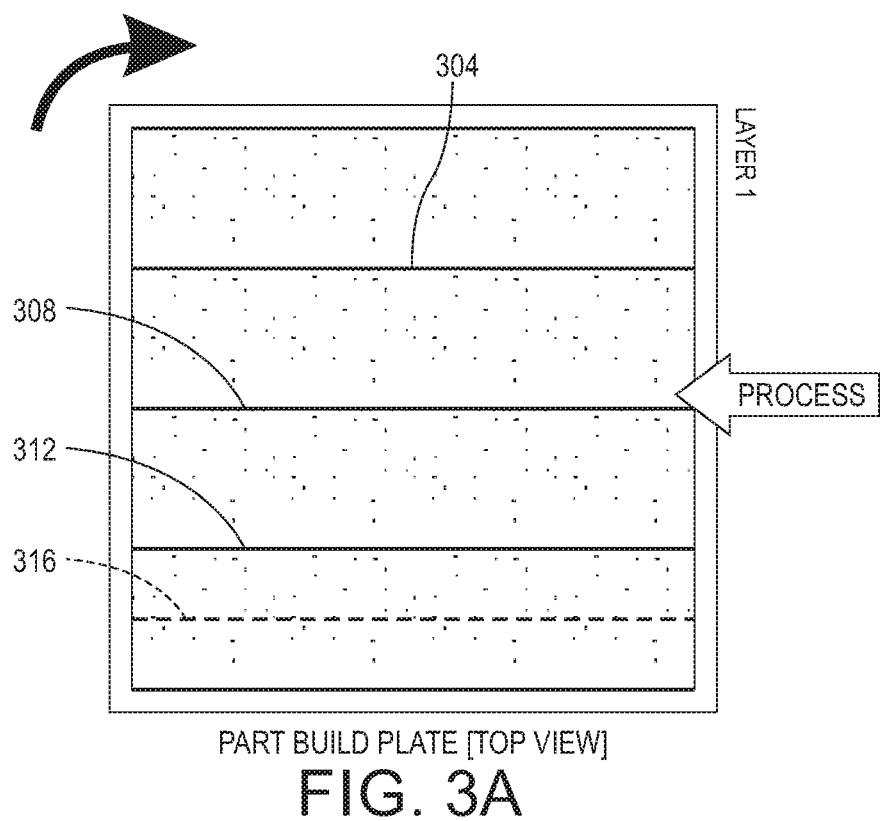
FIG. 3A to illustrates the movement of missing material associated with a defective ejector through four layers of an object to mitigate the adverse consequences of the missing material.
Figure 3B:
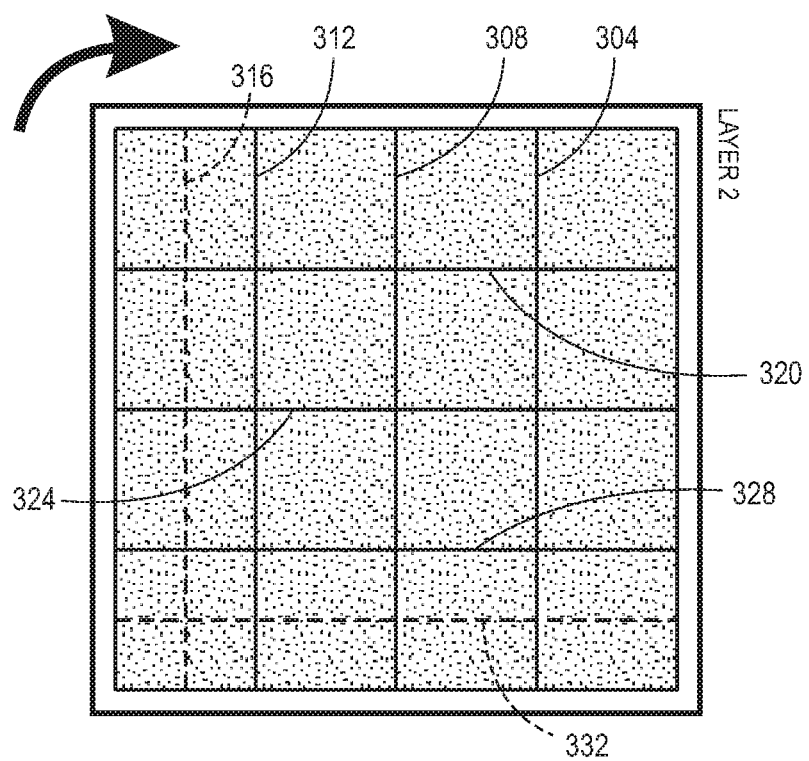
Figure 3C:
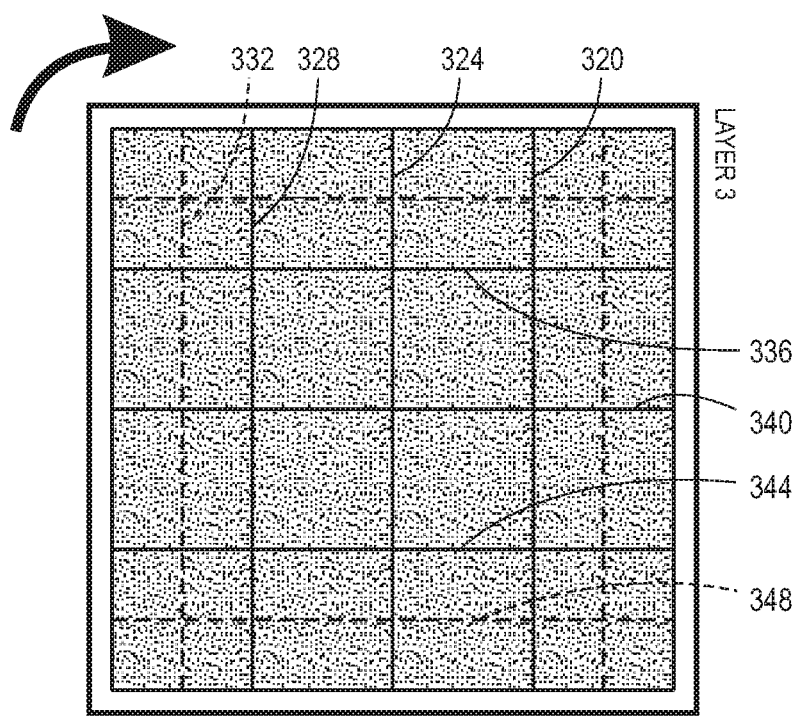
Figure 3D:
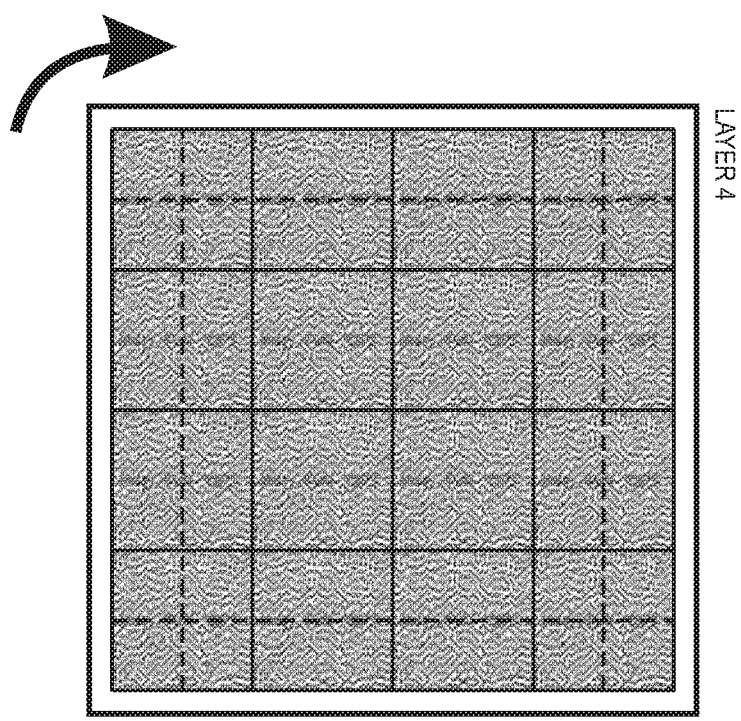

The process 200 enables the printer 100 to mitigate the effects of a defective ejector without substituting another ejector for missing or errant drops. As shown in FIG. 3A, the first layer is formed by the ejectors forming lines 304, 308, and 312. Dashed line 316 indicates a line that would have been formed if an ejector had been operational. After the platen 104 is rotated ninety degrees in the clockwise direction, the next layer (FIG. 3B) is printed with lines 320, 324, 328 and dashed line 332 indicates a line that would have been formed by the defective ejector if it were operational. After the platen 104 is rotated another ninety degrees in the clockwise direction, the next layer (FIG. 3C) is printed with lines 336, 340, 344 being printed over lines 304, 308, and 316 with different ejectors and dashed line 348 indicates a line that would have been formed by the defective ejector if it were operational. After the platen 104 is rotated another ninety degrees in the clockwise direction, the next layer (FIG. 3D) is printed with lines 352, 356, 360 being printed over lines 320, 324, and 328 with different ejectors and dashed line 364 indicates a line that would have been formed by the defective ejector if it were operational. Only four lines have been depicted in each layer to simplify the drawing and the explanation. As can be seen from the figures, the effects of the defective ejector have been distributed in different areas of the object. Once the platen is rotated another ninety degrees for the next layer formation, the missing line is positioned over the first missing line 316, but three layers intervene between the two missing lines. The intervening layers help attenuate the weakness in the object that would occur if the missing line was present in two adjacent layers at the same position.

Figure 5A:
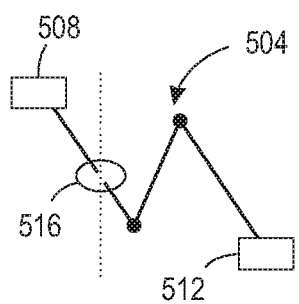
FIG. 5A illustrates a point of discontinuity formed in a multi-pass printer that does not rotate the platen during circuit formation.
Figure 5B:
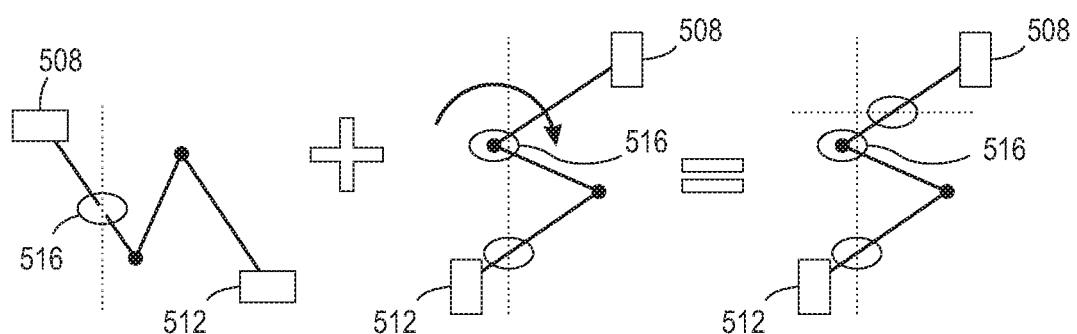
FIG. 5B illustrates a repair of the point of discontinuity shown in FIG. 5B by a multi-pass printer that rotates the platen during circuit formation.

The improvement in remedying defective ejectors is shown in FIG. 5A. An electrical trace 504 is formed between two electrical components 508 and 512. The trace 504 is formed by multiple passes of the ejectors over the circuit; however, the point of discontinuity 516 remains because the platen on which the circuit is being formed does not move. In FIG. 5B, a first pass of the ejectors over the circuit leaves a point of discontinuity 516, but after the platen is rotated 90 degrees, the trace is repaired. The second pass also adds continuity to the trace at the locations on the trace other than the point of discontinuity. Therefore, rotating the platen between passes in the formation of an electrical circuit helps ensure the integrity of the circuit and improves the throughput of the manufacturing process.

Figure 4:
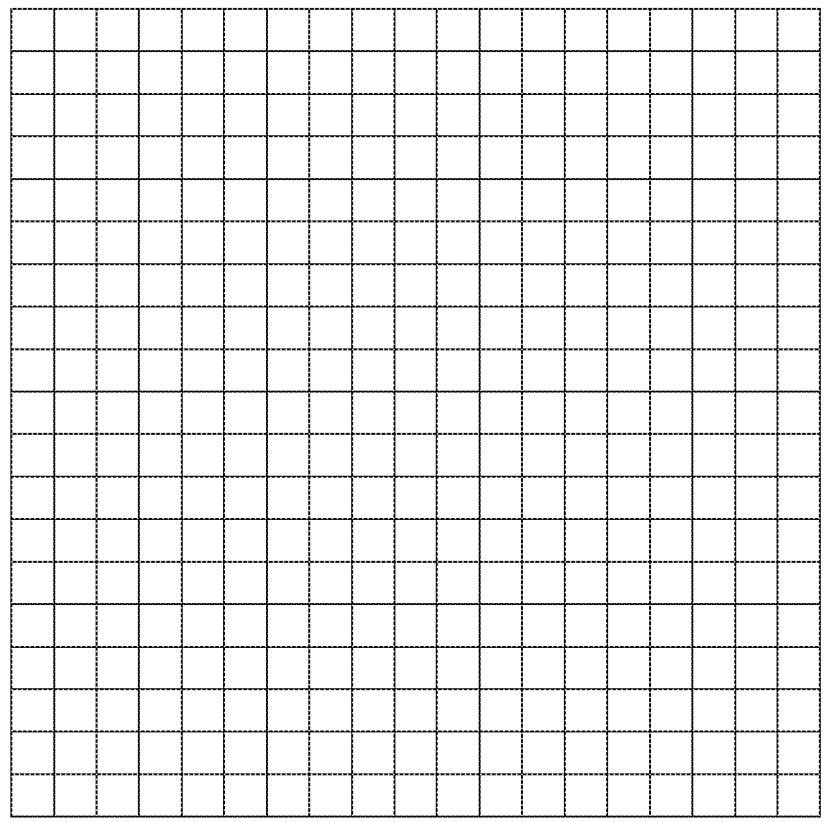
FIG. 4 is an illustration of two orthogonal layers in an object formed by the printer of FIG. 1.

As shown in FIG. 4, even when no defective ejector is present in an ejector head, the structural integrity of object layers is improved. As illustrated, the two printed layers are orthogonal to one another to distribute stresses to the object in two orthogonal directions. This structure helps dissipate stresses without cracks or other structural deformation occurring in the object. While the description above refers to orthogonal rotation of the platen on which objects are formed, other angles of rotation could be used. Rotations of 45 degrees enables eight layers to be formed before the initial orientation of the object to the ejectors is repeated. In another embodiment, the amount of angular rotation between passes of the ejectors can vary to improve the structural integrity of irregular features on the object or to address issues raised by the failure of multiple ejectors. To achieve this end, the controller is configured to rotate the platen with reference to defective ejector data that can be obtained through image analysis of formed layers or test patterns produced from time to time during the manufacturing process.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A printer comprising:
   a platen;
   at least one ejector head having a plurality of ejectors configured to eject drops of a material towards the platen;
   at least one actuator operatively connected to the platen and to the at least one ejector head;
   an encoder configured to generate angular data corresponding to rotation of the platen; and
   a controller operatively connected to the at least one actuator, the encoder, and the ejectors in the at least one ejector head, the controller being configured to:
   operate the at least one actuator to move the at least one ejector head across the platen while operating the ejectors in the at least one ejector head to form a first layer of an object on the platen using object layer data;
   operate the at least one actuator using defective ejector identification data while monitoring angular data generated by the encoder to rotate the platen a first predetermined number of degrees with respect to a z-axis through a center of the platen; and
   operate the at least one actuator to move the at least one ejector head across the platen while operating the ejectors in the at least one ejector head to form a second layer of the object on the platen using the object layer data, the second layer being oriented at the first predetermined number of degrees to the first layer.

2. The printer of claim 1, the controller being further configured to:
   operate the at least one actuator using the defective ejector identification data while monitoring angular data generated by the encoder to rotate the platen a second predetermined number of degrees with respect to the z-axis through the center of the platen; and
   operate the at least one actuator to raise the at least one ejector head a predetermined distance from the platen in a direction parallel to the z-axis; and
   operate the at least one actuator to move the at least one ejector head across the platen while operating the ejectors in the at least one ejector head to form a third layer of the object on the platen using the object layer data, the third layer being oriented at the second predetermined number of degrees to the second layer.

3. The printer of claim 2, the controller being further configured to:
   operate the at least one actuator using the defective ejector identification data while monitoring angular data generated by the encoder to rotate the platen a third predetermined number of degrees with respect to the z-axis extending through the platen; and
   operate the at least one actuator to move the at least one ejector head across the platen while operating the ejectors in the at least one ejector head to form a fourth layer of the object on the platen using the object layer data, the fourth layer being oriented at the third predetermined number of degrees to the third layer.

4. The printer of claim 3, the controller being further configured to:
   repeating the operation of the at least one actuator using the defective ejector identification data while monitoring angular data generated by the encoder to rotate the platen the first predetermined number of degrees, the second predetermined number of degrees, or the third predetermined number of degrees and the operation of the ejectors in the at least one ejector head along with the operation of the at least one actuator to raise the at least one ejector head after two layers have been formed until all of the layers of the object have been printed.

5. The printer of claim 3 wherein the first predetermined number of degrees, the second predetermined number of degrees, and the third predetermined number of degrees are each ninety degrees.

6. The printer of claim 3 wherein the first predetermined number of degrees is different than the second predetermined number of degrees, and the second predetermined number of degrees is different than the third predetermined number of degrees.

7. The printer of claim 1 wherein the operation of at least some of the ejectors forms electrical conductors in the first layer.

\* \* \* \* \*